(12) United States Patent
Zhang et al.

(10) Patent No.: US 6,639,594 B2
(45) Date of Patent: Oct. 28, 2003

(54) VIEW-DEPENDENT IMAGE SYNTHESIS

(75) Inventors: Zhengyou Zhang, Redmond, WA (US); Ko Nishino, Tokyo (JP); Katsushi Ikeuchi, Kanagawa (JP)

(73) Assignee: Microsoft Corporation, Redmond, WA (US)

(*) Notice: Subject to any disclaimer, the term of this patent is extended or adjusted under 35 U.S.C. 154(b) by 339 days.

(21) Appl. No.: 09/681,773

(22) Filed: Jun. 3, 2001

(65) Prior Publication Data

US 2003/0011596 A1 Jan. 16, 2003

(51) Int. Cl.⁷ .............................................. G06T 15/50
(52) U.S. Cl. ....................................................... 345/426
(58) Field of Search ............................... 345/426, 419, 345/420, 582, 583; 382/294

(56) References Cited

U.S. PATENT DOCUMENTS

| | | | | |
|---|---|---|---|---|
| 5,739,820 A | * | 4/1998 | Lyon ........................... | 345/426 |
| 5,870,097 A | * | 2/1999 | Snyder et al. ............... | 345/426 |
| 5,947,823 A | * | 9/1999 | Nimura ........................ | 463/32 |
| 6,057,851 A | * | 5/2000 | Luken et al. ................ | 345/586 |
| 6,317,126 B1 | * | 11/2001 | Tannenbaum ............... | 345/426 |
| 6,429,872 B1 | * | 8/2002 | Ernst ............................ | 345/584 |
| 6,545,677 B2 | * | 4/2003 | Brown ......................... | 345/426 |

OTHER PUBLICATIONS

Y. Sato, M.D. Wheeler, and K. Ikeuchi. Object shape and reflectance modeling from observation. In computer Graphics Proceedings, ACM SIGGRAPH 97, pp. 379–387, Aug. 1997.

Y. Yu, P. Debevec, J. Malik and t. Hawkins. Inverse Global Illumination: Recovering reflectance Models of Real Scenes From Photographs. In Computer Graphics Proceedings, ACM SIGGRAPH99, pp. 215–224, Aug. 1999.

D.N. Wood, D.I. Azuma, K. Aldinger, B. Curless, T. Duchamp, D.H. Salesin, and W. Stuetzle. Surface Light Fields for 3D Photography. In Computer Graphics Proceedings, ACM SIGGRAPH 00, pp. 287–296, Jul. 2000.

Zhang, Z. Flexible Camera Calibration By Viewing a Plane/from Unknown Orientations. In Proc. of Seventh International Conference on Computer Vision ICCV'99, pp. 666–673, Sep. 1999.

\* cited by examiner

*Primary Examiner*—Mark Zimmerman
*Assistant Examiner*—Huedung X Cao
(74) *Attorney, Agent, or Firm*—Lyon & Harr, LLP; Richard T. Lyon

(57) ABSTRACT

A system and process for efficiently representing an object and allowing the synthesizing of photo-realistic images of the object that depict both diffuse and specular reflections therefrom. This is accomplished using a sparse set of input images and a geometric model of the object. In particular, the reflectance components (i.e., diffuse and specular) are separated out of the input images based on the intensity variation of object surface points. The diffuse reflection component is characterized with a global texture map, while the specular reflection components are used to model the illumination distribution of the environment surrounding the object and to estimate the surface reflectance parameters. This framework provides a very compact representation of the object's appearance. Photo-realistic virtual images of the object from any desired viewpoint can be synthesized using the previously computed global texture map, illumination distribution, and reflectance parameters.

20 Claims, 13 Drawing Sheets

VIEW-DEPENDENT IMAGE SYNTHESIS

BACKGROUND OF INVENTION

1. Technical Field

The invention is related to synthesizing photo-realistic virtual images from actual images of an object, and more particularly to a system and process for efficiently representing an object to allow the synthesizing of photo-realistic images that depict both diffuse and specular reflections.

2. Background Art

Synthesizing photo-realistic virtual images from images of real objects is a major research topic in the computer vision and the computer graphics community. One avenue for producing these images is image-based rendering. Image-based rendering techniques use real 2D images of an object of interest as an input. Considering each pixel in the input images as samples of a plenoptic function, image-based methods synthesize virtual images by selecting the most appropriate sample of rays, or interpolating between the sampled rays. However, since these methods assume the object has a diffuse surface (rather than reflective), view-dependent variances such as specularity, that plays an important role in photo-realistic synthesis of images, is not taken into consideration. Essentially, reflective objects include both a diffuse reflection component which can be viewed as being constant at any particular point on the surface of the object of interest, and a specular reflection component that is dependent on the viewpoint from which the object is viewed. Both the reflectance parameters and illumination distribution of the environment surrounding object will dictate the amount of specular reflection that will be observed at any given viewpoint. It is this specular reflection component that is ignored in current image-based approaches. In addition, it is noted that since these image-based methods require only real images as the input, they provide high generality. In other words, they can be applied to a wide variety of objects and scenes. However, because of the principle of interpolation, these approaches tend to require a large number of input images. Although the light rays can be represented efficiently in lower dimensionality, and compression techniques such as vector quantization or MPEG-based approaches can drastically reduce the total amount of information to be stored, these methods still require a dense sampling of the real object which means taking hundreds of images.

Model-based methods or "Inverse Rendering" is another major avenue of research in the area of synthesizing photo-realistic virtual images. Model-based methods use both 2D images and a 3D geometric model of the target object to estimate the BRDF of the object surface, either by fitting a particular reflection model to the pixel values observed in input images [1] or by solving the inverse radiosity problem [2]. However, in these methods, the radiance and positions of the light sources needs to be known, and direct information of lighting environment has to be provided in some way, e.g., with high dynamic range images of the light sources.

Recent research in the so-called "3D photography" domain have proposed methods that go in between the image and model based approaches. By taking advantage of the latest advances in 3D sensing equipments, such as laser range scanners and structured light scanners, these approaches try to make full use of the 3D geometry as well as the images to synthesize images of an object that includes the specular reflection effects. For example, one such approach [3] in essence sets one of the 2D planes produced in a light field approach on to the object surface as represented by coarse triangular patches or dense surface points, respectively. By deriving information from the geometry in this way, these approaches succeed in achieving higher compression ratio without losing smooth view-dependent variation such as the movement of highlights. However, these methods still rely on very dense observation of the objects, and so require input of a large number (e.g., hundreds) of images of each object of interest.

The need for a large number of images of an object when using the above-described procedures has a significant disadvantage. For instance, consider a situation when a person wants to show an object to another person remotely, e.g., via the Internet, allowing this person to appreciate freely any detail of the object. This can also apply to what people might want to do when they are purchasing objects online, i.e., e-commerce. Current techniques require the user to take a large number of images of the object or assume the scene structure like the lighting environment is known perfectly. These techniques preclude a very typical situation where a user would take a limited number of snapshots of an object in interest with a digital camera, while moving around the object, and then want that information converted into some sort of representation, so that the user can see the object from arbitrary viewpoints or transfer the representation so that others can view the object.

It is noted that in this background section and in the remainder of the specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY OF INVENTION

The present system and process is designed to represent an object in an efficient manner and to allow the synthesizing of photo-realistic virtual images of the object that include the both diffuse and specular reflection effects. This is accomplished using a relatively sparse set of input images and without any direct information concerning the light sources (i.e., such as their radiance and positions). For example, the input images could be captured using a hand-held video camera. The input images needed can be limited to a number which is just enough to collectively depict every surface of the object that it is desired to render in the synthesized images from a viewpoint that captures substantially only diffuse reflection. The only data other than the input image that is required is a 3D model of the object, and the camera parameters. These items are readily available using conventional techniques.

The present system and process first extracts the view-dependent, specular reflection components, and view-independent, diffuse reflection components of the surface reflectance from the input images. Specifically, this is accomplished by computing a global texture map which specifies an intensity value for the diffuse reflection from each modeled portion of the surface of the object using the input images. Then, a specular reflection image is derived from each input image. These specular reflection images specify the intensity of the specular reflection from each modeled portion of the surface of the object depicted in the associated input image.

The global texture map is constructed by respectively identifying sets of pixels in the input images that depict the same portion of the object. Each of these sets of pixels is then processed to first determine which pixel of the set has the minimum pixel intensity value. The minimum intensity value is assigned to the location of the global-texture map corresponding to the portion of the object depicted in the set of pixels. The result is an intensity value being associated with each portion of the object depicted in the pixels of any of the input images. These intensity values represent the diffuse reflection associated with the depicted portion of the object.

Preferably, the 3D model represents the object's surface as a mesh of triangular patches, and so the global texture map will identify the diffuse reflection components associated with each of these triangular regions. To this end, the process of computing the global texture map preferably includes mapping each input image onto the 3D model so as to identify the location on the model associated with each pixel of each input image. Then, the aforementioned sets of pixels are identified. Specifically, sets of corresponding pixels from the input images that depict the same location in each triangular patch of the 3D model of the object are identified. Finally, as described previously, for each set of pixels, it is determined which pixel of the set has the minimum pixel intensity value, and that pixel value is associated with the location of the global texture map corresponding to the location in the 3D model depicted by the set of pixels.

Once the global texture map is complete, the aforementioned specular reflection images are created by first determining, for each input image, the diffuse reflection intensity value associated with each pixel of the input image from the global texture map. The diffuse reflection intensity value of each pixel is then subtracted from the overall intensity value of that pixel. The result of the subtraction procedure is designated as the specular reflection intensity value for the pixel under consideration. In this way, a specular reflection intensity value is eventually assigned to each pixel location of each input image to form the desired specular reflection images.

The global texture map acts as the desired efficient representation of the diffuse reflection components of the object as a whole. However, the specular reflection images constitute a considerable amount of data, and it would be advantageous to represent the data more efficiently. This is accomplished by using the specular reflection images to model the illumination distribution of the environment surrounding the object, and to estimate reflectance parameter for the object's surface in the form of an overall surface spectral magnitude and surface roughness. The illumination distribution and reflectance parameters, which constitute much less data than the specular reflection images as a whole, can be employed along with the global texture map to synthesize photo-realistic virtual images of the object.

The illumination distribution of the environment surrounding the object is modeled by establishing a hemisphere of a prescribed radius, which overlies and is centered about the object. This hemisphere is used as a basis to create a separate so-called illumination hemisphere for each of the specular images. An illumination hemisphere is created from a specular image by determining the point of intersection with the hemisphere of a line originating from the location on the object's surface corresponding to a pixel of the specular image. This line is directed along the perfect mirror direction with respect to the optical ray of the pixel, where the optical ray is a line originating from the optical center of the camera used to capture the input image associated with the specular image and which goes through the input image pixel corresponding to the specular image pixel under consideration. The intensity value of the specular image pixel is associated with the intersection point, and the process is repeated for all the remaining pixels the specular image. In order to reduce the data necessary to model the illumination distribution, the aforementioned hemisphere is preferably represented by a geodesic dome. If so, each intensity value associated with an intersection point is assigned to the vertex point of the geodesic dome that is closest to the intersection point.

Once all the individual illumination hemispheres have been created, they are combined to form a generalized illumination hemisphere. This generalized illumination hemisphere represents the desired model of the illumination distribution of the environment surrounding the object. Combining the individual illumination hemispheres could simply entail computing the mean of the intensity values assigned to any vertex of the geodesic dome having more than one assigned value, and then assigning the mean to that vertex in lieu of the individual intensity values. However, imaging noise and errors introduced in the aforementioned alignment process can reduce the accuracy of the generalized illumination hemisphere considerably. Fortunately, these effects can be reduced before combining the individual illumination hemispheres. The procedure for reducing the effects of imaging noise and errors involves, for each geodesic dome vertex point, first determining in how many of the specular images the vertex point is visible. Then it is determined how many intensity values have been assigned to the vertex point among all the individual illumination hemispheres created from the specular images. These number are compared, and whenever the numbers do not match, the intensity values assigned to the vertex point are eliminated from each of the affected illumination hemispheres. This results in any noise being eliminated as well. The combining procedure is completed by computing the mean of the intensity values assigned to any vertex of the geodesic dome having more than one assigned value, and then assigning the mean to that vertex in lieu of the individual intensity values.

The aforementioned surface reflectance parameters, namely the surface spectral magnitude and surface roughness of the object, are computed next. In essence this entails establishing a reflection model which characterizes the specular reflection from a location on the surface of the object in terms of the surface spectral magnitude, the surface roughness and the magnitude of the color vector associated with each point light source defined by the illumination distribution model. Preferably, a simplified Torrance-Sparrow reflection model is employed for this purpose. Given the model, the particular values of the surface spectral magnitude, the surface roughness, and the magnitude of the color vector associated with each point light source are computed, which collectively minimize the square of the difference between the specular reflection intensity computed using the reflection model and the intensity of the specular reflection taken from the specular images, for each location on the surface of the object corresponding to a pixel of the specular images. In addition, it is preferred that the illumination distribution model be refined as part of the foregoing computations. This is accomplished by replacing the intensity values associated with each point light source defined in the initial generalized illumination hemisphere with the computed magnitude of the color vector associated with that point light source.

The global texture map, generalized illumination hemisphere, and reflectance parameters constitute the desired efficient representation of the input image data, and are all that is needed to synthesize realistic virtual images of the object form any desired viewpoint. Specifically, images of the object are synthesized by first using the global texture map to identify the diffuse reflection values associated with each pixel of an image depicting the portions of the object visible from the desired viewpoint. In this way, a diffuse reflection image is created for the desired viewpoint. Next, the generalized illumination hemisphere and the surface reflectance parameters are used to identify the specular reflection values associated with each pixel of an image depicting the portions of the object visible from the desired viewpoint. This image represents the specular reflection image for the desired viewpoint. Finally, the diffuse and specular reflection images associated with the desired viewpoint are composited to create the desired synthesized image of the object. This compositing simply involves adding the intensity values of the corresponding pixel locations in the diffuse and specular reflection images.

In addition to the just described benefits, other advantages of the present invention will become apparent from the detailed description which follows hereinafter when taken in conjunction with the drawing figures which accompany it.

BRIEF DESCRIPTION OF DRAWINGS

The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
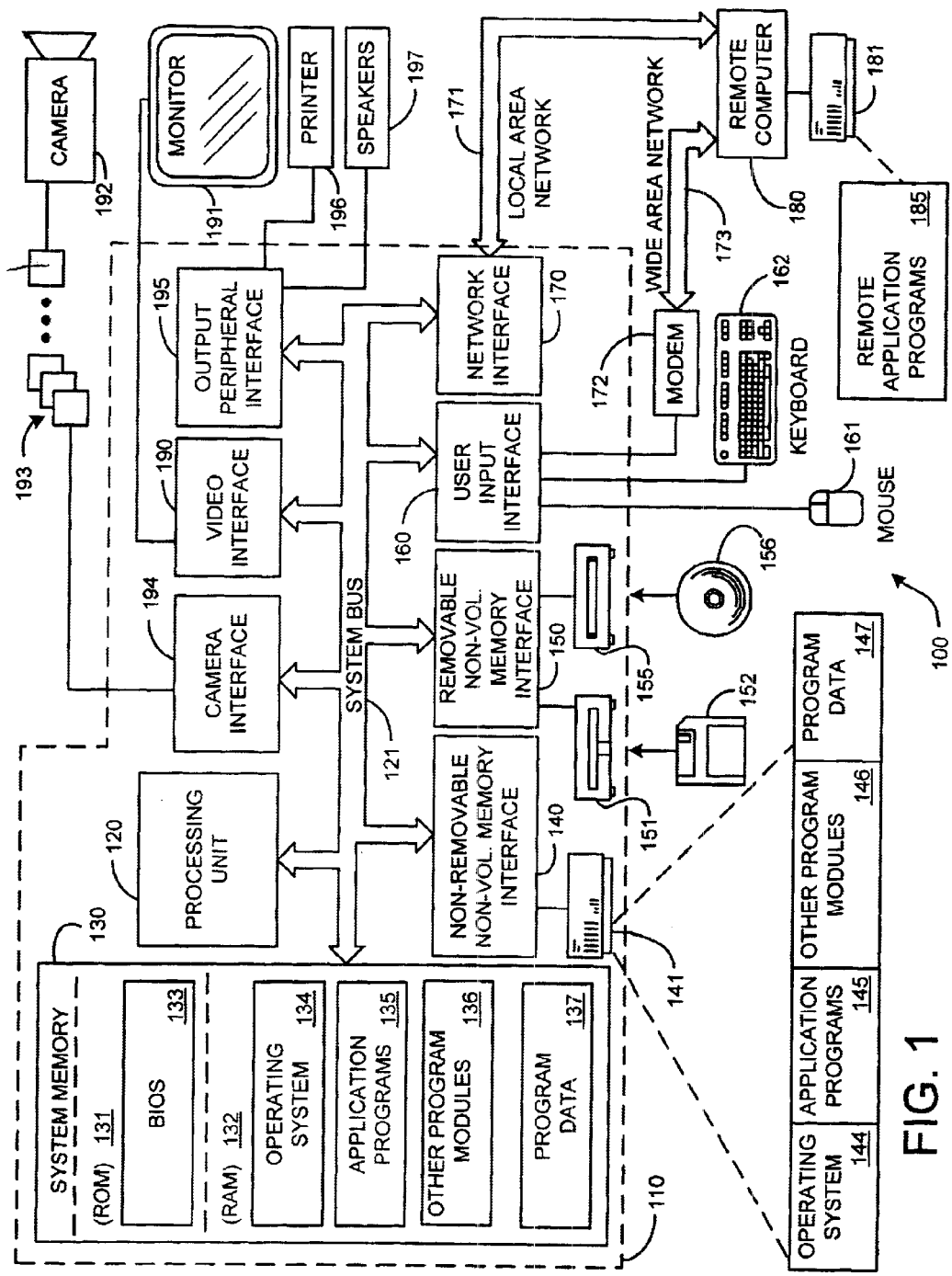
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
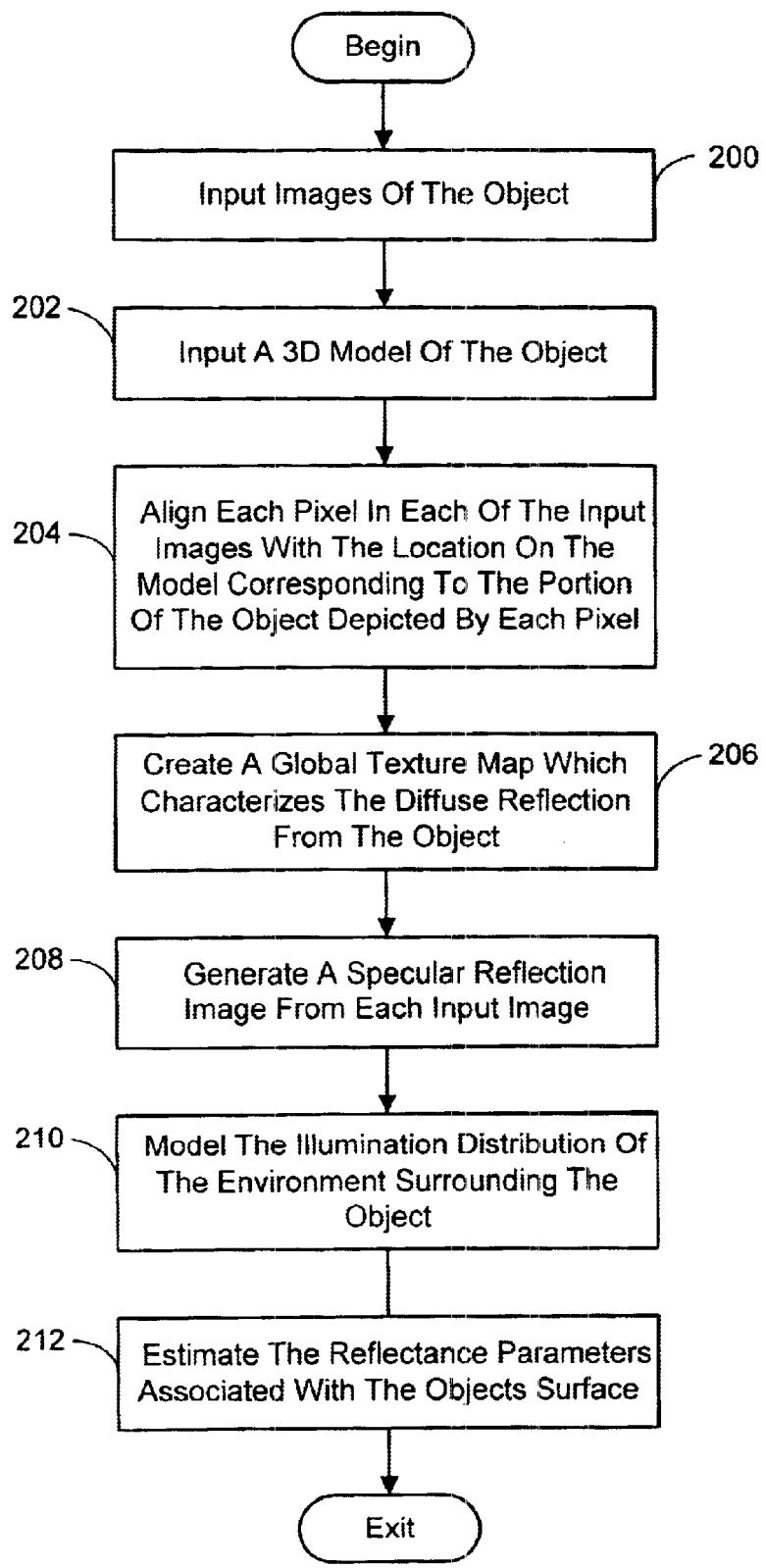
FIG. 2 is a flow chart diagramming an overall process for efficiently representing an object to allow the synthesizing of photo-realistic images of the object that depict both diffuse and specular reflections in accordance with the present invention.

The exemplary operating environment having now been discussed, the remaining part of this description section will be devoted to a description of the program modules embodying the invention. Generally, the system and process according to the present invention involves generating an efficient representation of both the diffuse and specular reflection components of an object of interest from a sparse set of input images of the object and a 3D model of the object. These representations are used to synthesize photo-realistic, view-dependent, views of the object for any desired viewpoint. This is essentially accomplished via the following process actions, as shown in the high-level flow diagram of FIG. 2. First, a sparse set of images of the object of interest are input (process action 200). This sparse set of images collectively depict every surface of the object that it is desired to render in synthesized images, captured from a viewpoint that shows substantially only diffuse reflection. A 3D model of the object is also inputted, as indicated by process action 202. Each pixel in each of the input images is then aligned with the location on the object in the model corresponding to the portion of the object depicted by that pixel (process action 204). Next, a global texture map which specifies an intensity value for the diffuse reflection from each portion of the surface of the object as modeled in the 3D model is created using the input images (process action 206). A separate specular reflection image is then generated from each input image and the global texture map (process action 208). The pixels of each specular image identify the specular reflection intensity value for the portion of the surface of the object depicted by the corresponding pixel in the associated input image. The specular reflection images are used to model the illumination distribution of the environment surrounding the object (process action 210). In addition, the reflectance parameters associated with the objects surface are estimated (process action 212). These parameters preferably include the overall surface spectral magnitude and overall surface roughness of the object. The following sections (i.e., 1.0 through 4.0) will describe the foregoing actions in detail.

Once computed, the global texture map, illumination distribution, and reflectance parameters are used to synthesize photo-realistic, view-dependent images of the object of interest from any desired viewpoint around the object. This synthesizing process is described in detail in Section 5.0.

1.0 Obtain Input Images and a 3D Model of the Object of Interest

A "sparse" set of images of the object of interest is obtained as input to the present system and process. Each of these input images is preferably captured from a different perspective. The term "sparse" refers to the desire to minimize the number of images of the object that must be captured and input in order to synthesize photo-realistic, view dependent, images of the object from arbitrary viewpoints. As to how many images constitutes a minimum, there are some constraints and tradeoffs that are considered. For example, the images should collectively show all the surfaces of interest on the object in order to allow synthesizing images of the object from any desired viewpoint. To this end, it is preferred that more images of a complex shaped portion of the object be captured and input in comparison to a smooth portion of the object. This ensures that each surface in the complex area is depicted in at least one of the images. In addition, it is important that any surface of interest on the object appear in at least one image taken from a perspective that for the most part does not capture the highlight (i.e., the specular reflection) of the surface. In other words, each portion of the object's surface should be captured from a viewpoint where the reflection is totally or at least substantially all due to diffuse reflection rather than specular reflection. These "non-highlight" views of a surface of the object are needed to accurately compute the diffuse reflectance components, as will be described in more detail below. Thus, it can be seen that the number of images required increases with the complexity of the object. However, even for complex objects, the number of images required with the present invention is far less than current techniques for synthesizing photo-realistic, view-dependent images.

The images of the object of interest can be captured by any practical method. The only requirements are that the intrinsic camera parameters and the extrinsic parameters associated with each image must be known, and that the object and the light sources do not move significantly during the image capturing process. Only the camera is allowed to move. For example, the images can be captured casually using a handheld camera and the camera parameters derived from the images themselves. This could involve first pre-calibrating the camera [4, 5] to obtain the intrinsic parameters, and then applying conventional computer vision techniques to estimate the camera motion and compute the extrinsic parameters associated with each image.

In addition to the input images and their associated camera parameters, the present system and process also requires a 3D geometric model of the object. This model can be obtained via any appropriate conventional method. For example, the model could be derived from the input images using so-called stereo from motion techniques. Alternately, the model could be obtained directly using range finding devices such as a laser range scanner or structured light scanner.

2.0 Align the Input Images with the 3D Model

Once the images, camera parameters and a 3D model of the object have been obtained, each image is "aligned" with the model. This process is performed using conventional techniques. For example, laser scanners provide low resolution texture together with a 3D point cloud representing the object. Thus, alignment of the 2D images with the 3D model can be achieved by solving the error minimization problem between 2D and 3D point correspondences. It is also noted that if the target object has enough texture, computer vision techniques can be used to obtain the 3D model directly from input color images as well as the camera motion.

Essentially, the result of the alignment process is to match each pixel in each image to a particular location on the surface of the object of interest. Thus, for each pixel, the 3D coordinates of the portion the object's surface depicted by that pixel is determined and stored.

3.0 Decomposing the Input Images into Their Diffuse and Specular Reflection Components The next phase of the process for synthesizing photo-realistic, view-dependent images of the object of interest is to decompose the input images in regard to their reflection components. To this end, a global texture map of the object is created that identifies the diffuse reflection intensity values associated with each pixel of the input images. In addition, a view-dependent reflection image whose pixels represent the specular reflection components $I_S$ of the light reflected by the corresponding object surfaces are created from each input image.

The light reflected on the object surface can be approximated as a linear combination of these two reflection components:

$$I = I_D + I_S \quad (1)$$

The mechanism of the diffuse reflection is essentially the internal scattering of light by an object. When an incident light ray penetrates the object surface, it is reflected repeatedly at a boundary between small particles and medium of the object. The scattered light ray eventually reaches the object surface, and is reflected into the air in various direction. This phenomenon results in diffuse reflection. Since the directions of the reflected lights can be assumed to be evenly distributed in all directions, a Lambertian model is widely used to approximate this diffuse reflection. The Lambertian model is described with the cosine of the angle $\theta_i$ between the illumination direction and the surface normal, multiplied by the diffuse color vector $K_D$, i.e., $$I_D = K_D \cos \theta_i \quad (2)$$

The other reflection component, the specular reflection $I_S$, characterizes the light directly reflected at an interface between the air and the surface medium. This specular reflection has a spike in the perfect mirror direction with relatively weak intensity spread (i.e., a lobe) around this direction. The lobe is caused by the microscopic roughness of the object surface. Since the spike of the specular reflection can only be observed on object surfaces smooth enough in comparison with the wavelength of the incident light and when the camera viewing direction is aligned with the perfect mirror direction, we can ignore the spike when approximating the specular reflection with a numerical model. The lobe of specular reflection can be approximated by an intensity distribution having the peak in the perfect mirror direction. Since, the total light reflected from any point of the surface of the object of interest is the sum of the diffuse and specular reflection components, it is possible to identify the diffuse reflection intensity component for a point and subtract it from the total intensity to obtain the specular reflection intensity component. This is the approach taken in the present system and process.

In order to compute the diffuse reflection components, it should be recognized that an assumption is made that the object and light sources in the environment surrounding the object remains fixed during the time the input images are captured, and that only the camera is moved (i.e., the viewing direction changes throughout the image sequence captured by the camera). Given this, the diffuse reflection component of the light reflected at any point on the object can theoretically be deemed to be constant (and so "view-independent"). Thus, only the specular component will vary depending on the viewpoint from which the object is viewed.

Figure 3:
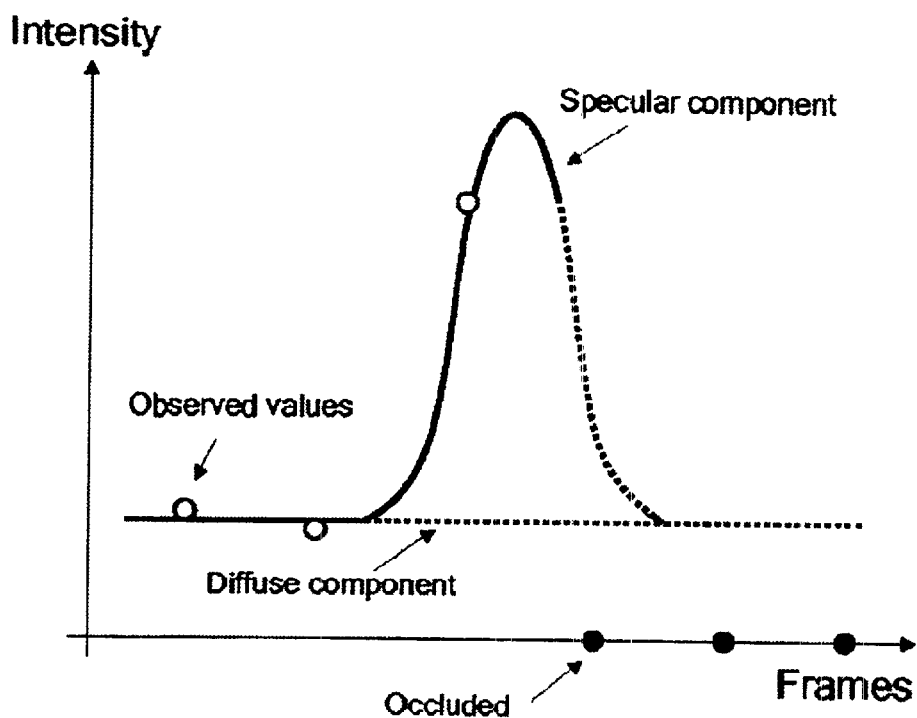
FIG. 3 is a graph plotting pixel intensity of a pixel depicting a portion of an object in a series of image frames that capture the object from varying perspectives.

The curve in FIG. 3 shows how the intensity value on a particular surface point should vary while the camera moves around the object. The pixel value should be constant and have a peak if the highlight passes through that surface point. As the diffuse reflection is theoretically constant throughout the image sequence, storing one value for each point on the object surface is enough to represent this diffuse reflection. In practice it is difficult to obtain this constant intensity value from the input image sequence. For example, the circles on the left side of FIG. 3 show the pixel values of a particular surface point through the image sequence. Due to the noise inherent in the imaging sensor, the intensity varies from image to image. If a large number of images is used as the input, it would be possible to draw an intensity histogram for each surface point, and fit, for example, a Gaussian model to the peak to derive the constant diffuse reflection component. However, as it is desired to employ a sparse set of images, usually only a few sample points will be available, as depicted with white circles in FIG. 3. The black circles in FIG. 3 indicate that the surface point is invisible in those images due to occlusion. In view of this, the diffuse reflection component for each pixel is approximated in the present system and process by identifying the pixel, among the pixels in the respective images depicting the same portion of the object's surface, that exhibits the minimum intensity value. This minimum value is deemed to be the diffuse reflection intensity for that portion of the object's surface. Granted, imaging noise and the possibility that the minimum intensity value will include some amount of specular reflection, will make it difficult to obtain the exact values for the diffuse reflection components. However, the values found using the minimums should be reasonably close.

Finally, for the sake of efficient representation of the diffuse reflection component associated with each portion of the object's surface, a texture approach is adopted that results in the production of the aforementioned global texture map of the object. This global texture map essentially identifies the intensity of the diffuse reflection from each portion of the object's surface modeled by the 3D model of the object. Preferably, the 3D model represents the object's surface as a mesh of triangular patches, and so the global texture map will identify the diffuse reflection component associated each pixel of each of these triangular regions representing the object's surface pixel.

Figure 4A:
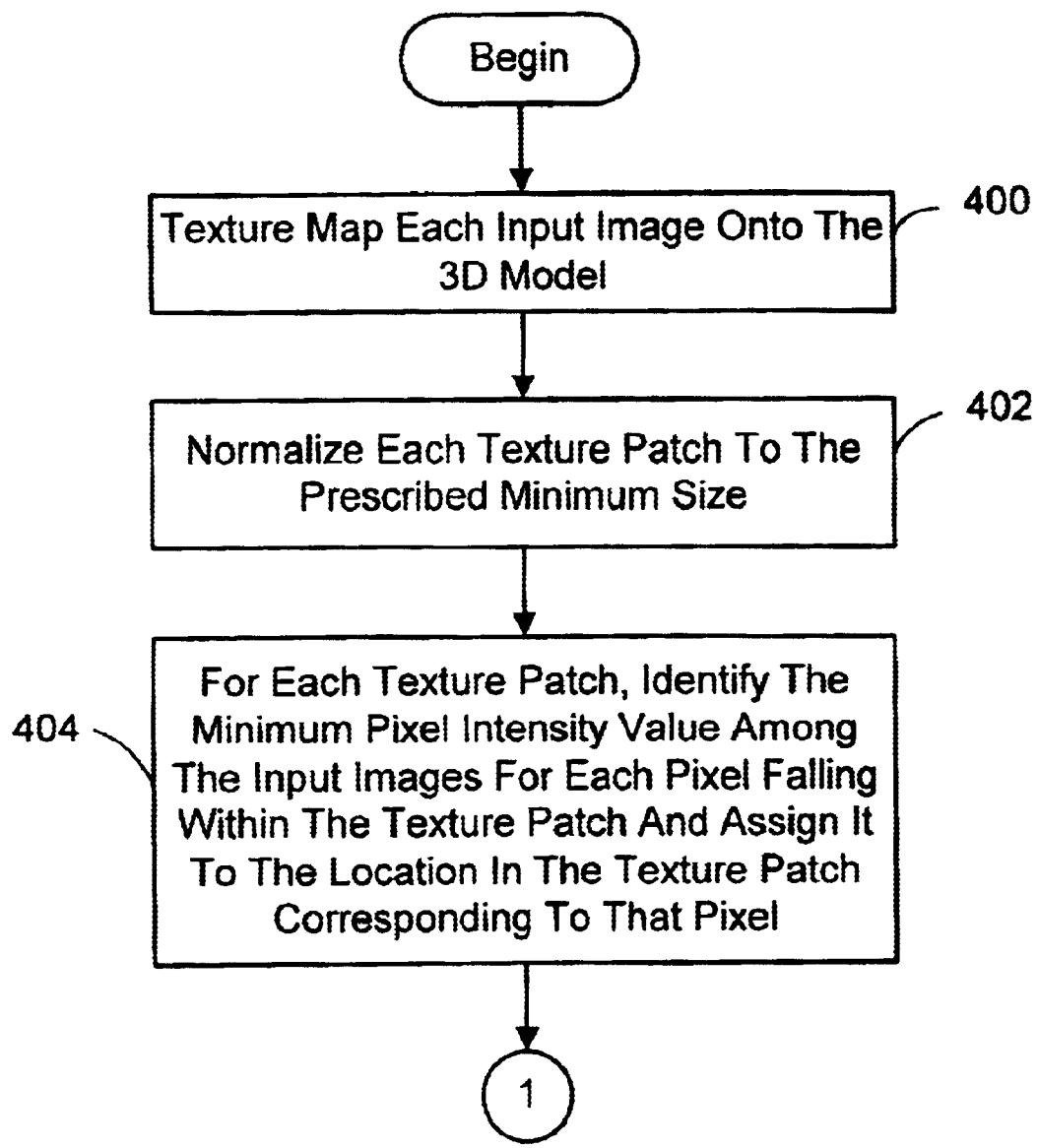
FIGS. 4A and 4B are a flow chart diagramming a process for decomposing input images of an object into their diffuse and specular reflection components that implements the global texture map and specular image creation actions of FIG. 2.
Figure 4B:
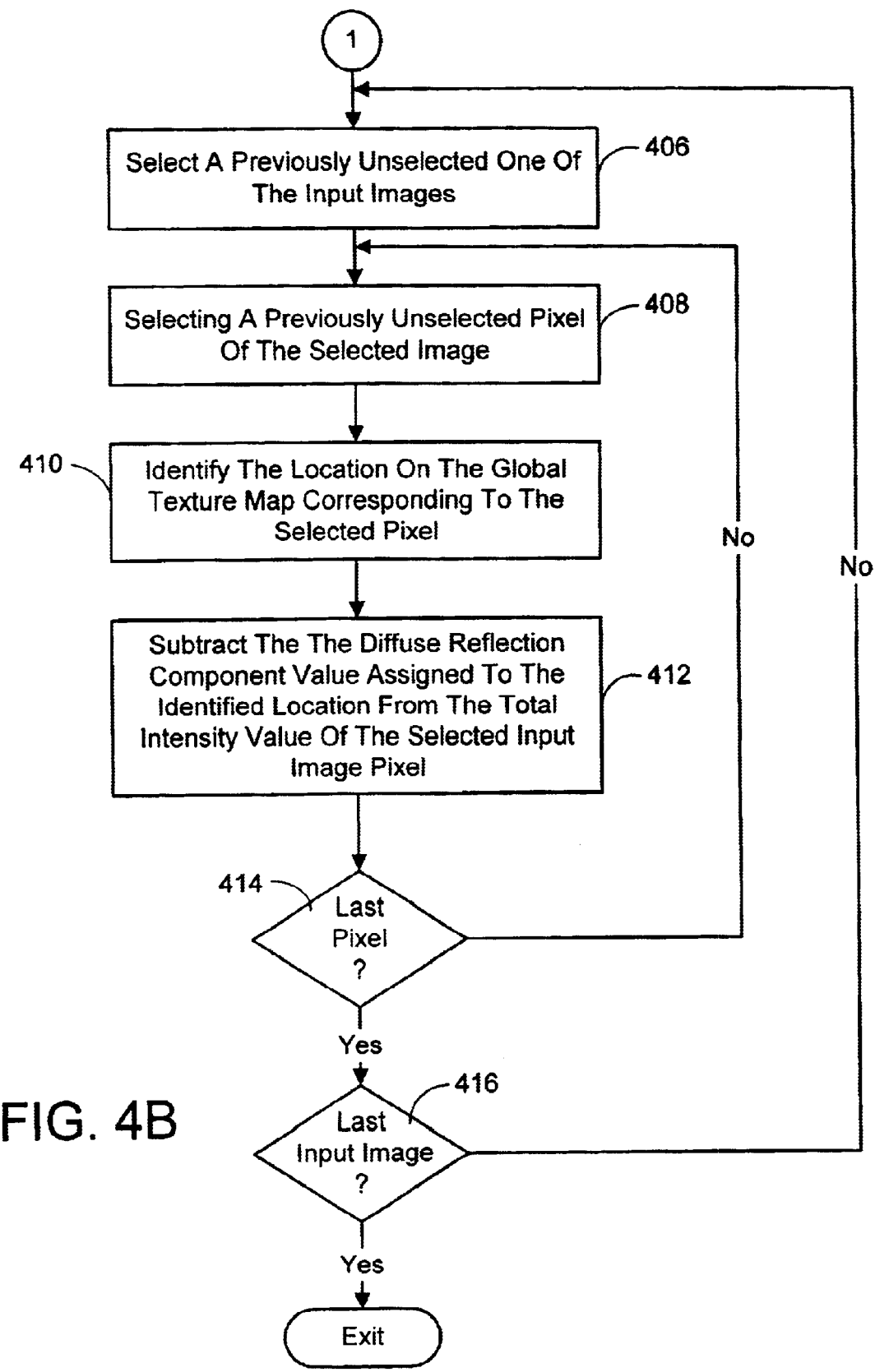

Referring to FIGS. 4A and 4B, the process of decomposing the input images into diffuse and specular reflection components preferably involves first texture mapping each input image onto the aforementioned 3D model (process action 400). This mapping can be accomplished using any appropriate conventional texture mapping technique. Each resulting triangular texture patch is then preferably normalized to the same minimum size (process action 402). This minimum size will depend on several things, such as the resolution of the input images, the level of detail of the 3D model and the memory available to store the texture data. For example, in tested embodiments of the present invention these factors allowed the legs of the triangular patches to be normalized to a size of 20 by 20 pixels. Next, for each texture patch, the minimum pixel intensity value found among the input images for each pixel falling within the texture patch is identified and assigned to the location in the texture corresponding to that pixel (process action 404). Each minimum pixel intensity represents the diffuse reflection component for the associated pixel, and taken as a whole the minimum pixel intensity values form the aforementioned global texture map.

A specular reflection component is then computed for each pixel in each input image. Referring to FIG. 4B, this entails first selecting a previously unselected one of the input images (process action 406), and then selecting a previously unselected pixel of the selected image (process action 408). Next, the location on the global texture map corresponding to the selected pixel is identified (process action 410). In other words the location on the map corresponding to portion of the object's surface depicted by the selected pixel is identified. The diffuse reflection component value assigned to the identified location is then subtracted from the total intensity value of the input image pixel under consideration (process action 412). The computed difference represents the specular reflection component for the selected pixel. It is then determined if there are any remaining previously unselected pixels in the selected image (process action 414). If there are remaining pixels, then process actions 408 through 414 are repeated until all the pixels in the selected image have been considered. This result is a specular reflection image associated with the selected input image. Once the last pixel in the currently selected input image has been processed, it is determined if there are any remaining unprocessed input images (process action 416). If so, a previously unselected input image is selected (process action 406) and process actions 408 through 416 are repeated until all the images have been considered. At that point, the process ends.

Figure 5:
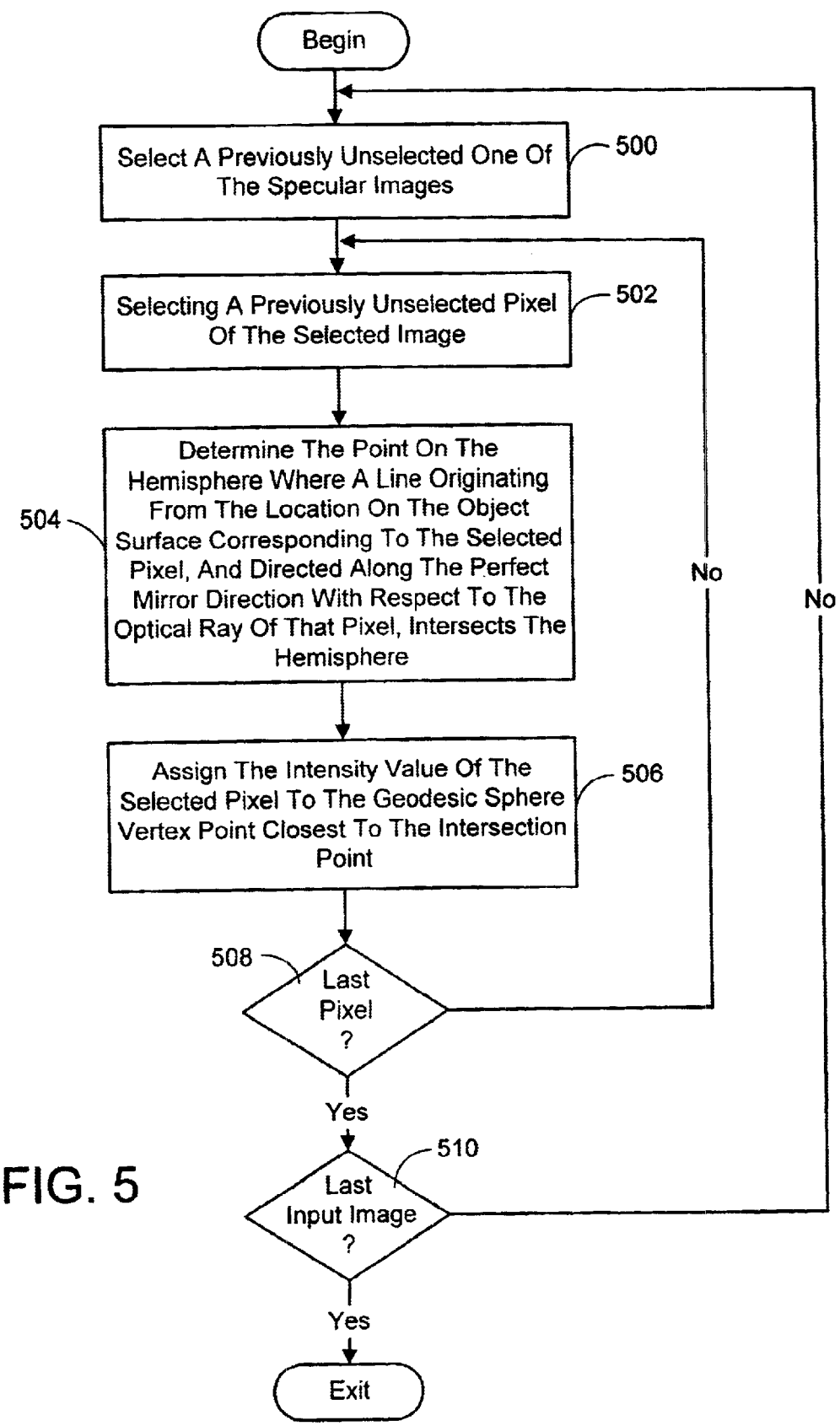
FIG. 5 is a flow chart diagramming a process for generating illumination hemispheres from each specular image that implements a part of the illumination distribution modeling action of FIG. 2.

4.0 Estimate the Illumination Distribution of the Environment and the Reflectance Parameters of the Object's Surface The foregoing decomposition phase of the present system and process resulted in the creation of a global texture map identifying the diffuse reflection components associated with each location on the object's surface depicted in a pixel of at least one of the input images. This map provides the desired efficient representation of the diffuse reflection components associated with the object. However, the decomposition phase also produced a specular reflection component image from each of the input images. It would be advantageous if these specular images could be efficiently represented as well. The next phase of the present system and process involves creating such an efficient representation of the computed specular reflection values. Essentially, this is accomplished by modeling the lighting environment of the scene surrounding the object, and estimating the reflectance parameters (i.e., an overall surface spectral magnitude and surface roughness) of the object's surface. The lighting environment is modeled by first recovering an initial approximation of the illumination distribution of the environment as represented by an "illumination hemisphere" derived from the specular reflection component images. To this end, a hemisphere is deemed to exist, which is modeled as the upper half of a geodesic sphere (i.e., a geodesic dome) centered over the object. The diameter of the hemisphere is made large in comparison to the object (e.g., 10 times the size of the object) and the number of vertex points (i.e., the level of detail of the geodesic pattern) is preferably made as large as feasible. The illumination hemisphere is then computed as outlined in the flow diagram in FIG. 5. Specifically, a previously unselected one of the specular images is selected (process action 500), and then a previously unselected pixel of the selected specular image is selected (process action 502). Next, the point on the hemisphere where a line originating from the location on the object surface corresponding to the selected pixel, and directed along the perfect mirror direction with respect to the optical ray of that pixel, intersects the hemisphere is determined (process action 504). The intensity value of the selected pixel is then assigned to the geodesic sphere vertex point closest to the intersection point of the perfect mirror direction associated with the pixel and the hemisphere (process action 506). It is noted that the perfect mirror direction can be easily computed using the previously input camera parameters and the surface normal extending from the center of the area of the object depicted by the pixel under consideration (as derived from the 3D model). It is next determined if there are any remaining previously unselected pixels in the selected specular image (process action 508). If so, process actions 502 through 508 are repeated, until all the pixels in the selected image have been considered. At that point it is determined if there are any remaining previously unselected specular images that have not been processed (process action 510). If there are remaining images, then process action 500 through 510 are repeated, until all the specular images have been processed. The result of the foregoing procedure is a set of individual illumination hemispheres associated with each specular image.

The individual illumination hemispheres created as described above from each specular reflection component image are next combined to produce an initial generalized illumination hemisphere approximating the illumination environment surrounding the object. This could be done by simply taking the mean of the intensity values assigned to each vertex and assigning the value to that location. However, imaging noise and alignment errors introduced in the foregoing processes can reduce the accuracy of the generalized illumination hemisphere considerably. Fortunately, these effects can be reduced before combining the individual illumination hemispheres. The procedure for reducing the effects of the noise and errors is based on the fact that when the intensity of a pixel in a specular image represents pure specular reflection, a line originating from the location on the object surface corresponding to the selected pixel, and directed along the perfect mirror direction with respect to the optical ray of that pixel, will always intersects the hemisphere at the same point, regardless of the viewpoint associated with the specular image. Given this, the number of intensity values assigned to the same corresponding point among the individual illumination hemispheres must equal the number of camera viewpoints from which that point on the hemisphere is visible. In other words, for every camera viewpoint from which a particular point light source in the hemisphere is visible, it is expected that an intensity value will be assigned to that point on the hemisphere from each of the specular images whose associated input image was captured from those viewpoints. If fewer, or more, than the expected number of intensity values are assigned to a hemisphere point, then it can be assumed that noise has corrupted the data associated with that point. Those points on the hemisphere where it is suspected noise has corrupted the data can be ignored with acceptable results.

Figure 6:
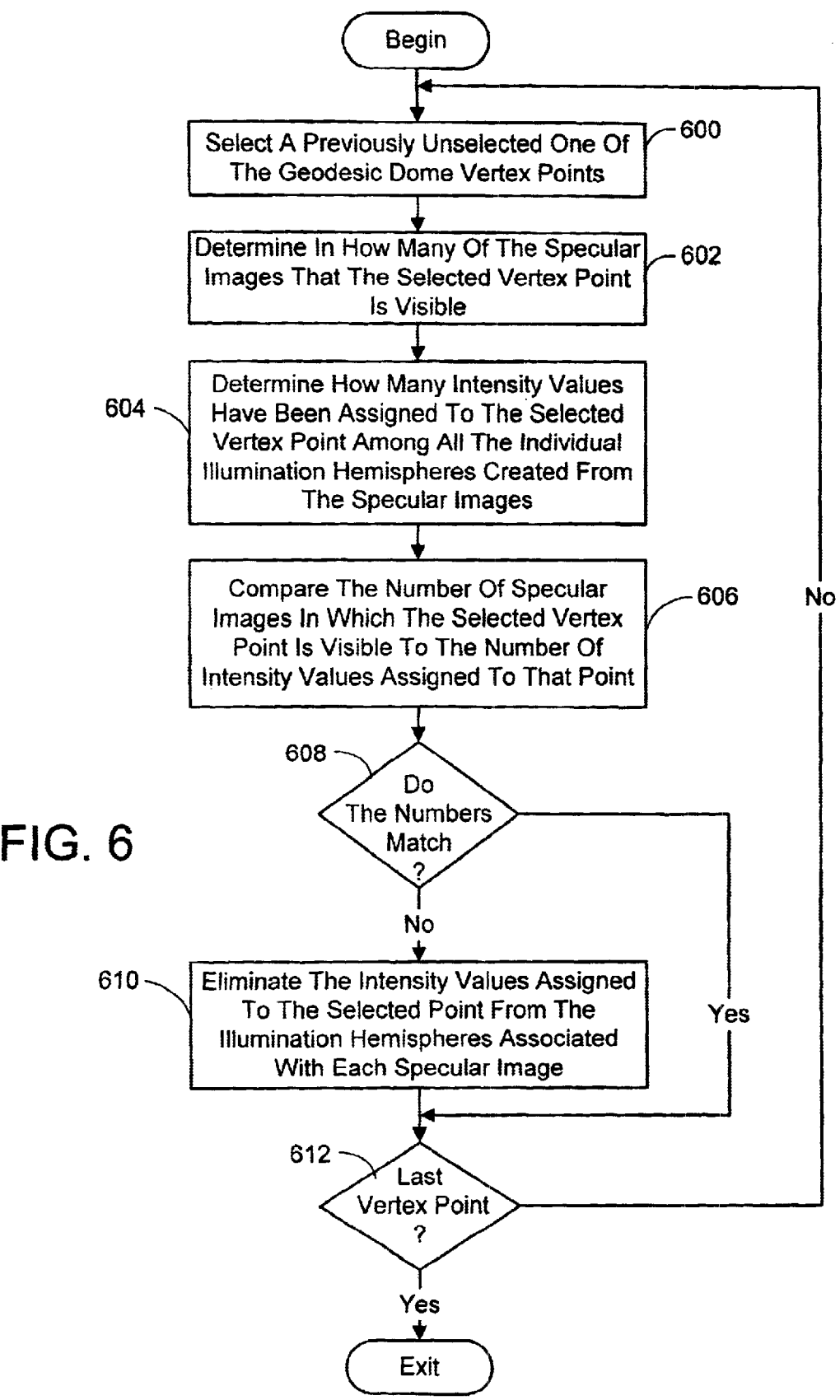
FIG. 6 is a flow chart diagramming a process for reducing the effects of imaging noise and alignment error in the illumination hemispheres associated with each specular image that implements a part of the illumination distribution modeling action of FIG. 2.

In order to identify the aforementioned suspect locations, a check is preferably performed as follows. Referring to FIG. 6, a previously unselected one of the geodesic dome vertex points is selected (process action 600). It is then determined in how many of the specular images that the selected vertex point is visible (process action 602). This can be easily calculated using the previously-computed camera parameters. It is also determined how many intensity values have been assigned to the selected vertex point among all the individual illumination hemispheres created from the specular images (process action 604). The number of specular images in which the selected vertex point is visible is then compared to the number of intensity values assigned to that point (process action 606), and it is determined if the numbers match (process action 608). If the numbers do not match, then the intensity values assigned to the selected location are eliminated from consideration (process action 610). Thus, these intensity values will not be considered when combining the individual illumination hemispheres to form the generalized illumination hemisphere. If, however, the numbers do match, then no action is taken. It is next determined if there are any remaining vertex points that have not been checked (process action 612). If so, then process actions 600 through 612 are repeated. However, if there are no vertex points left to consider, then the process ends.

Once the check procedure is complete, the individual illumination hemispheres are combined by computing the mean of the intensity values assigned to each vertex (if any) and assigning the value to that location. The result is the aforementioned generalized illumination hemisphere.

Figure 7A:
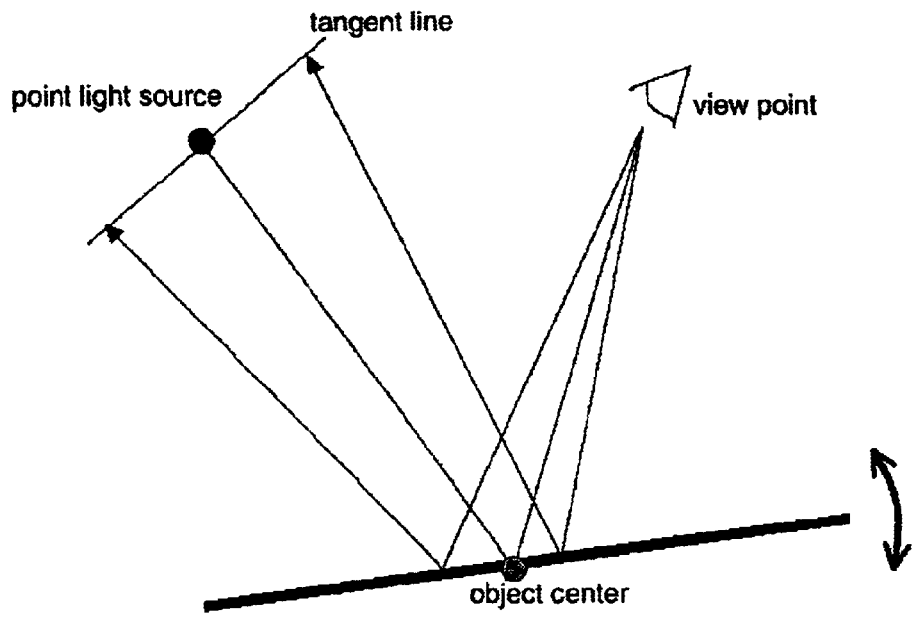
FIG. 7A is a diagram illustrating the geometry associated with creating an illumination hemisphere where a viewpoint is set in a position so that the light source and the viewpoint are in a perfect mirror position with respect to the object center. When the object line orientation is varied while fixing the surface reflectance properties and the point light source's position and brightness, the viewpoint changes accordingly to stay in a perfect mirror configuration. The line shown perpendicular to the light source-to-object center direction can be considered as a section of the illumination hemisphere.
Figure 7B:
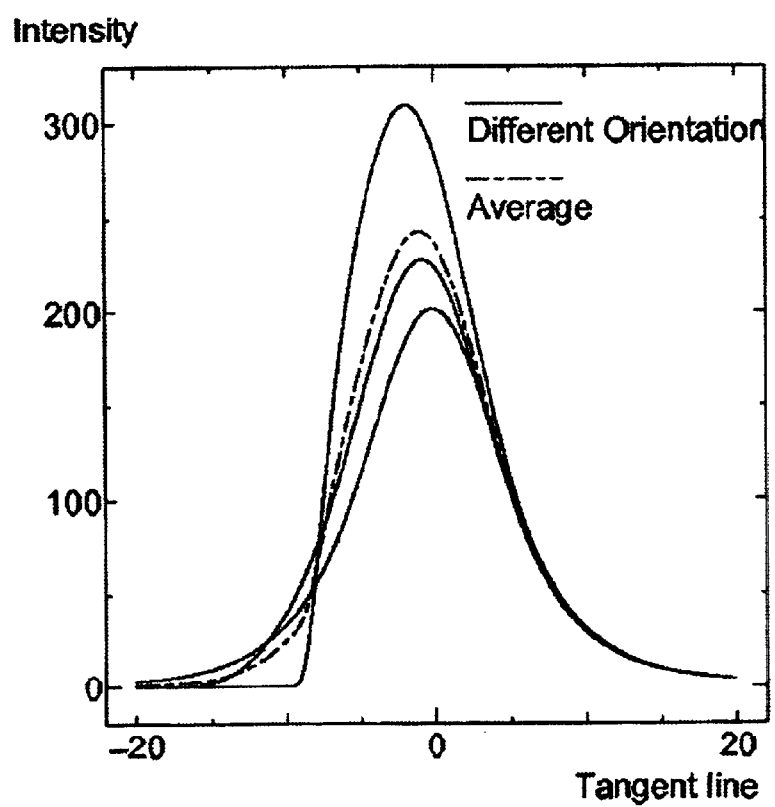
FIG. 7B is a graph illustrating the variation in intensity (referred to as the "illumination curve") observed when intensity values are "shot back" along the perfect mirror direction given the geometry depicted in FIG. 7A. The process of varying the object line orientation in FIG. 7A results in various distinct illumination curves shown in FIG. 7B.

The significance of the above-described illumination hemisphere will now be explained in reference to the simple 2D example shown in FIGS. 7A and 7B. As depicted in FIG. 7A, the viewpoint is set in a position so that the light source and the viewpoint are in a perfect mirror position with respect to the object center. When the object line orientation is varied while fixing the surface reflectance properties (K F, G and σ in Eq. (3) below) and the point light source's position and brightness, it can be seen that the viewpoint changes accordingly to stay in a perfect mirror configuration. Assuming there is a line perpendicular to the light source-to-object center direction. It can be considered as a section of the illumination hemisphere. If the observed intensity values are "shot back" along the perfect mirror direction, a curve is obtained, referred to as an "illumination curve", as shown in FIG. 7B. The process of varying the object line orientation results in various distinct illumination curves as shown in FIG. 7B. This is equivalent to observing an object from different viewpoints in a real scenario. If one of the illumination curves is considered as the illumination distribution, and it is assumed there is no roughness on the object surface, then the image rendered in the original viewpoint for that curve will be indistinguishable from the original image, but the images rendered for other viewpoints will not match the original images. This is because the illumination curves corresponding to what was observed in data images, while assuming no surface roughness, are different from each other. In other words, if multiple views of the same highlight are multiplied, it is possible to differentiate the effect of the surface reflectance properties from the lighting distribution based on the input image data. In other words, it is possible to estimate both of them. Also, it is evident that those parameters cannot be estimated if there is only one observation of each highlight. This is because the surface roughness can be embedded in the lighting distribution without changing the appearance. Note that it is not necessarily to estimate the true illumination radiance distribution. All that need be done is to estimate the illumination distribution and the surface reflectance properties such that the highlights in the residual images can be explained. Combining partial illumination hemispheres as described in the last subsection gives the average of overlapped curves (depicted in dashed line in FIG. 7B).

Although the initial generalized illumination hemisphere provides a good approximation of the actual illumination distribution, the effect of the surface reflectance properties, such as roughness, is not taken into account. In order to achieve a more accurate synthesis of photo-realistic, view-dependent images of the object of interest, the surface reflectance properties (i.e. specifically the overall surface spectral magnitude ($k_S$) and surface roughness ($\sigma$) will be estimated. These parameters are used later to synthesize the images of the object of interest. In doing this, an assumption is made that the object has the same surface spectral magnitude ($k_S$) and surface roughness ($\sigma$) over its entire surface. At the same time, it is preferred that the initial approximation of the generalized illumination hemisphere be refined.

In order to accomplish the aforementioned task, a reflection model will be used, and both the surface reflectance properties and the intensities of the nodes on the geodesic illumination hemisphere will be estimated using the generalized illumination hemisphere computed previously as an initial guess. The foregoing task is preferably accomplished by first assuming a simplified Torrance-Sparrow reflection model defines the specular reflection component of the light reflected from the surface of the object of interest, and then using an iterative, two-step, numerical minimization process to simultaneously refine the illumination distribution and determine the surface reflectance properties. Specifically, the Torrance-Sparrow reflection model defines the spectral reflection component ($I_s$) as:

$$I_s = \frac{1}{\cos\theta_r} K_s F G \exp\left[-\frac{\alpha^2}{2\sigma^2}\right] \quad (3)$$

where $K_S$ is the color vector of the reflection which accounts for the gain of the sensor measuring intensity, the source strength, the normalization factor of the exponential function, and the reflectivity of the surface, F is the Fresnel's coefficient, G is the geometrical attenuation factor, is the angle between the viewing direction and the surface normal, $\theta_r$ is the angle between the surface normal and the bisector of the viewing direction and the light source direction, and Y represents the surface roughness. This Torrance-Sparrow reflection model uses a Gaussian distribution with its mean in the perfect mirror direction.

It will be assumed that the geometrical attenuation factor G in Eq. (3) is 1 and the Fresnel reflectance coefficient F is constant. These assumptions are valid for most dielectric and metal surfaces, where a metallic surface is considered to have mostly specular reflection components, while a dielectric surface is defined as one having both diffuse and specular reflection components and a uniform distribution of reflection causing elements. With these assumptions, a simplified Torrance-Sparrow reflection model is created where the specular reflection/is given by:

$$I_{S,m} = K_{S,m} \frac{1}{\cos\theta_r} \exp\left[-\frac{\alpha^2}{2\sigma^2}\right] \quad (4)$$

with $$K_{S,m} = k_S g \int_i \tau_m(\lambda) s(\lambda) d\lambda \quad (5)$$

where m stands for each R, G and B component, g is the scene radiance to surface irradiance ratio, $k_S$ is the spectral magnitude, T is the spectral response, S is the surface irradiance on a plane perpendicular to the light source direction, and $\lambda$ is the wavelength.

Each node on the illumination hemisphere is considered as a point light source. Because linearity holds in surface irradiance, the specular reflection at point v on the object surface can be computed as:

$$I_{S,m}(v) = k_{S,v} \sum_i^{N_\perp} \omega_i L_{I,m} \frac{1}{\cos\theta_r} \exp\left[-\frac{\alpha^2}{2\sigma_v^2}\right] \quad (6)$$

where $L_{I,m}$ stands for the radiance of each point light source in each color band, and $\omega_I$ stands for the solid angle of the area that each point light source represents.

From Eqs. (4) and (5), it can be seen that the color vector direction of the specular reflection is the same as that of the light source. If it is assumed that all light sources in the environment have the same color, the average color of the initial illumination hemisphere can be used as the color of the light sources. Consequently, the specular reflection intensity on the surface of the 3D model in each image is reduced to:

$$I_S = \frac{2\pi}{N_I} k_{S,v} \sum_l^{N_L} L_I \frac{1}{\cos\theta_r} \exp\left[-\frac{\alpha^2}{2\sigma_v^2}\right] \quad (7)$$

Note that m has been eliminated, and $L_I$ is now the magnitude of the color vector of each point light source. Now, the surface reflectance parameters k and $\sigma$ can be estimated, and the initial generalized illumination hemisphere refined by estimating $L_I$, through minimizing the following objective function:

$$\min(I_v - I_{S,v})^2 \quad (8)$$

where $I_v$ is the observed intensity value in residual images, and $I_{S,v}$ is the intensity value computed from Eq. (7).

Since the value of the surface roughness parameter a is usually much smaller than the light intensities $L_I$ and spectral magnitude $k_S$, it will be difficult for the numerical minimization to converge if it is attempted to estimate all three at one time. Instead, the surface roughness parameter $\sigma$ and the combination of $L_I$ and $k_S$ are alternatively estimated in different iterations. This process is repeated by turns until the parameters converge. It is noted that the Y value in the $YC_rC_b$ color coordinate is used as the initial estimation of $L_I$. Due to the possible error introduced in the construction of the global texture, it is expected that outliers in the specular images will exist. To handle this, the reflection parameter estimation problem is solved in an M-estimator framework, where the objective function is:

$$E(x) = \frac{1}{N_V} \sum_c^{S_i} p(z_v(x)) \quad (9)$$

with $$z_v(x) = \left(\frac{I_v - I_{S,v}}{\sigma_{crr}}\right)^2 \quad (10)$$

where x is either ($L_I$, $k_{S,V}$) or ($\sigma_V$) depending on the iteration, and where a Lorentzian function is employed such that $$\rho(z) = \log\left(1 + \frac{1}{2}z^2\right) \quad (11)$$

5.0 Synthesize Photo-Realistic Images of the Object

Figure 8:
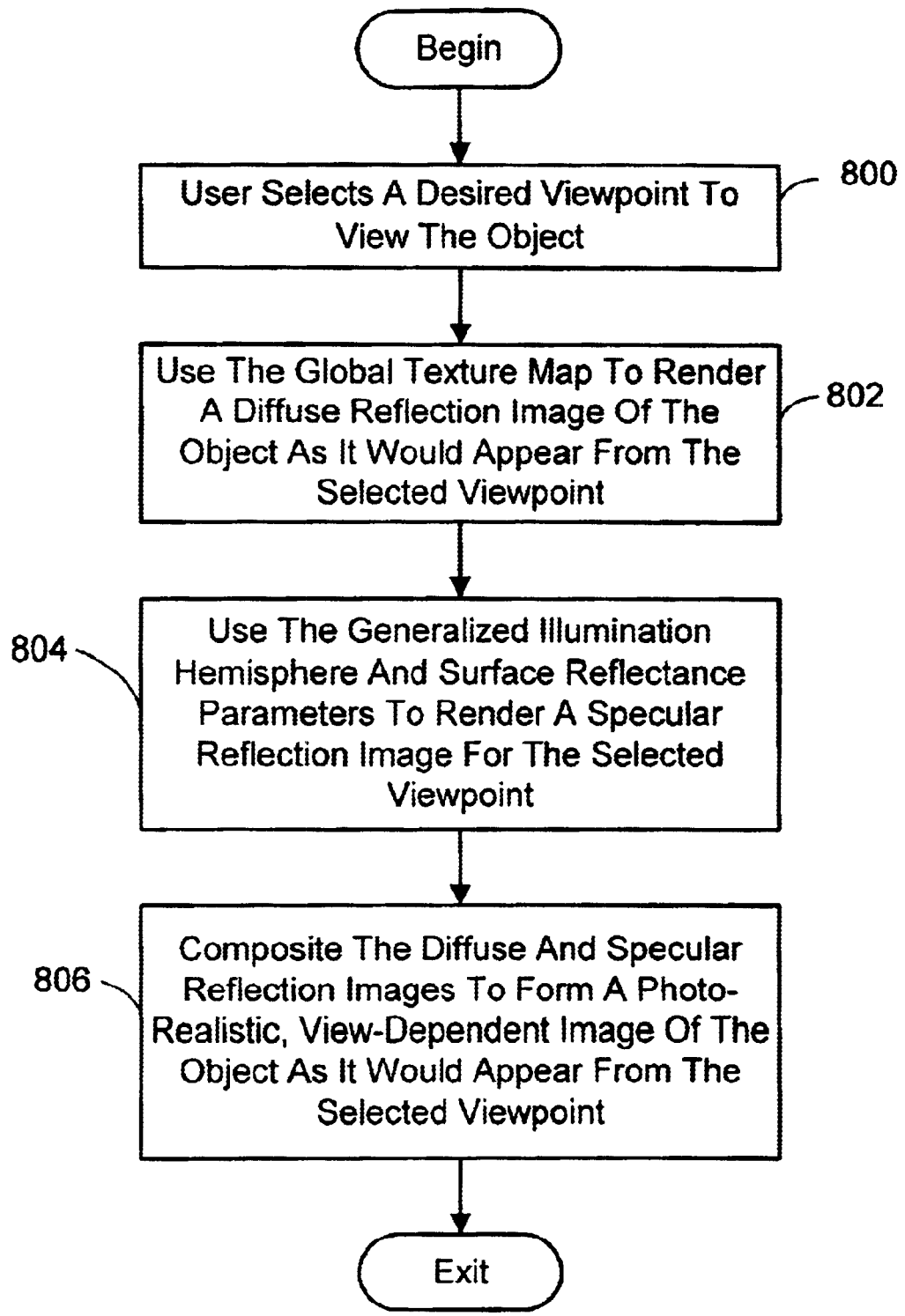
FIG. 8 is a flow chart diagramming an overall process for synthesizing an image of an object from a user selected viewpoint using the representation of the object created via the process of FIG. 2.

The result of the foregoing process is a refined approximation of the illumination distribution in the form of a color vector magnitude value L for each vertex point I (i.e., presumed point light sources) of the generalized illumination hemisphere, as well as an approximation for the surface spectral magnitude ($k_S$) and surface roughness ($\sigma$) parameters for the object of interest. In addition, a global texture map of the diffuse reflection components associated with the surface of the object has been computed. This information is used to synthesize photo-realistic, view-dependent images of the object of interest from any desired viewpoint around the object. Specifically, as outlined in the flow diagram of FIG. 8, the user first selects a desired viewpoint to view the object (process action 800). A diffuse reflection component image of the object as it would appear from the selected viewpoint is then rendered based on the global texture map using standard rendering techniques (process action 802). In addition, a specular reflection component image for the selected viewpoint is rendered from Eq. (7) using the color vector magnitude values L of the final generalized illumination hemisphere, as well as the final surface spectral magnitude ($k_S$) and surface roughness ($\sigma$) parameters, to compute the specular reflection intensity for each pixel of the image (process action 804). The diffuse reflection and specular reflection component images are then composited to form a final photo-realistic, view-dependent image of the object as it would appear from the selected viewpoint (process action 806). Essentially, this is accomplished by adding the diffuse and specular reflection intensity values together at each corresponding pixel location.

6.0 Experimentation Results.

Figure 13:
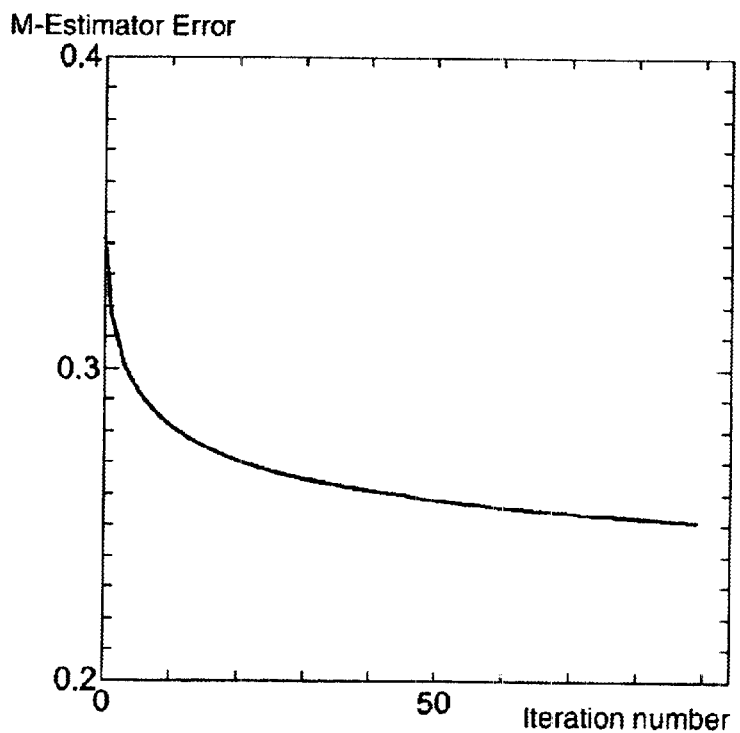
FIG. 13 is a graph plotting the M-estimator average error against the number of iterations, where each iteration includes two-steps, each of which consists of 5 line minimization loops.
Figures 9A, 9B:
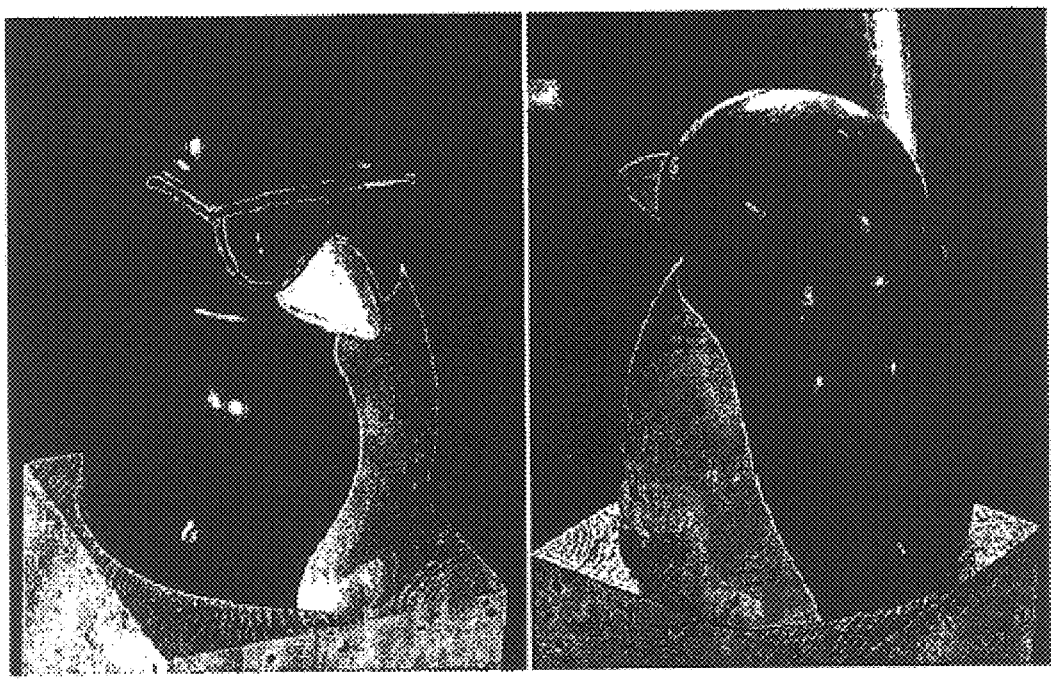
FIGS. 9A and 9B are two of eight input images employed in a tested embodiment of the present invention.
Figure 10:
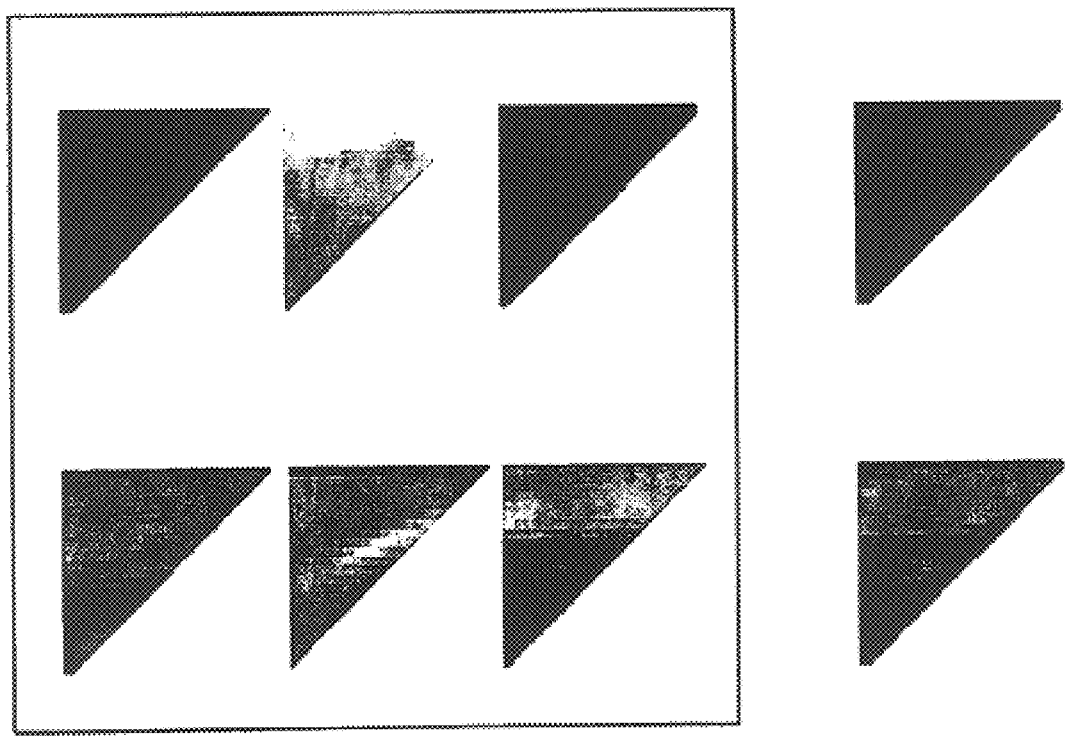
FIG. 10 illustrates two examples (i.e., top and bottom) of the texture variation seen in an input image sequence. These examples are contained within the box on the left side of the figure. The corresponding global textures are shown to the right of the box.
Figures 11A, 11B:
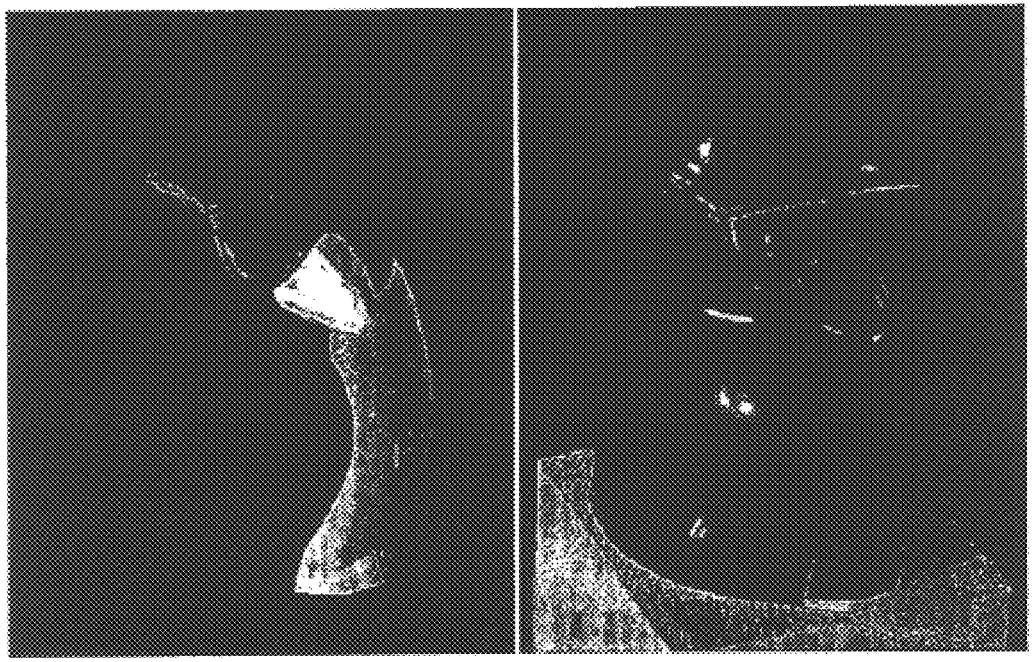
FIG. 11A is an image depicting the global texture (i.e., diffuse reflection components) corresponding to FIG. 9A.
FIG. 11B is an image depicting the specular reflection components of the object shown in FIG. 9A.
Figures 14A, 14B:
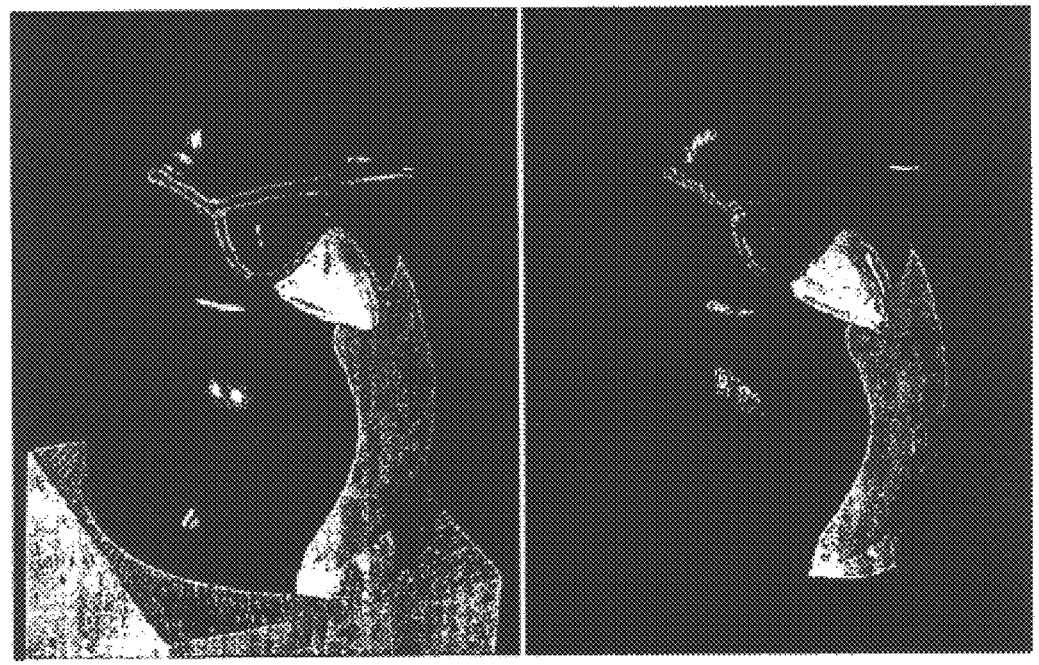
FIGS. 14A and 14B provide a side-by-side comparison of an input image of an object (FIG. 14A) and a synthesized image (FIG. 14B) having a corresponding viewpoint.
Figures 12A, 12B:
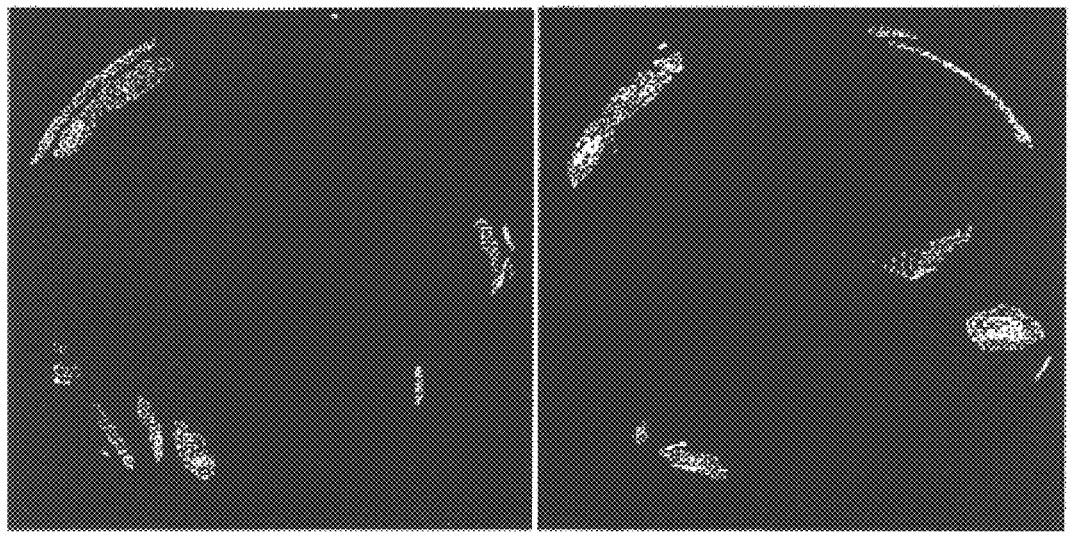
FIGS. 12A and 12B are images depicting the illumination hemispheres derived from two different specular images mapped onto a 2D plane (i.e., y=0).
Figures 12C, 12D:
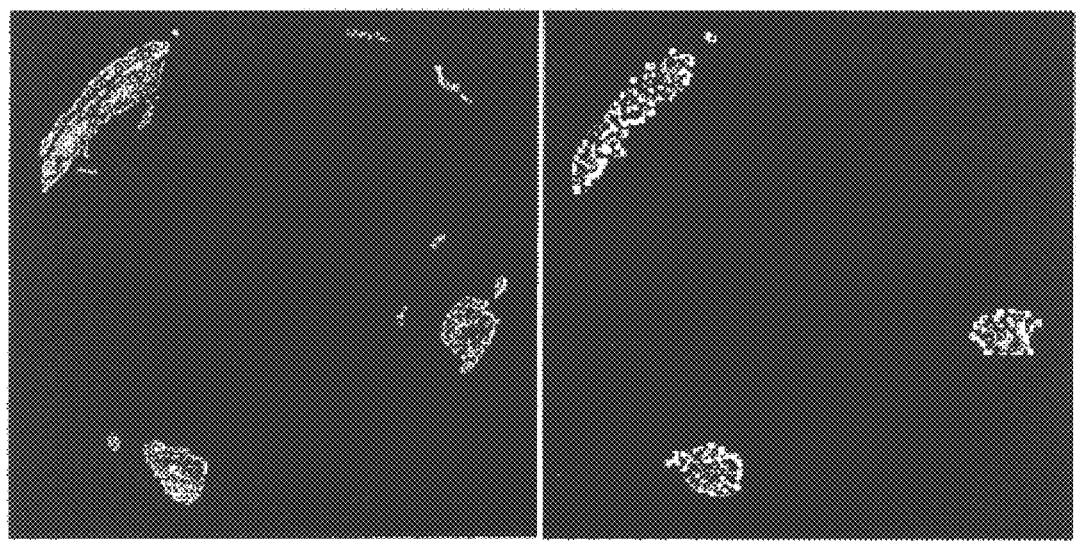
FIG. 12C is an image depicting an initial generalized illumination hemisphere (mapped onto a 2D plane, y=0) constructed by combining individual illumination hemispheres derived from a set of specular images including those shown in FIGS. 12A and 12B.
FIG. 12D is an image depicting a refined generalized illumination hemisphere (mapped onto a 2D plane, y=0) derived from the hemisphere depicted in FIG. 12C, where each point light source has been splatted for visualization purposes.
Figures 15A, 15B:
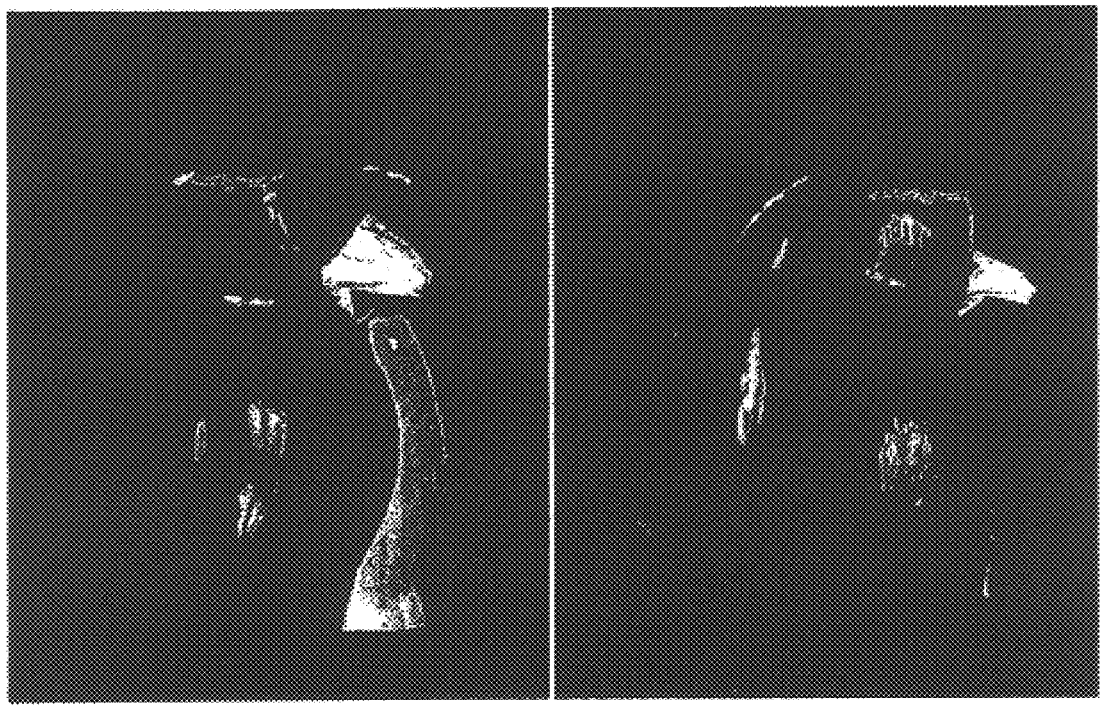
FIGS. 15A and 15B are synthesized images of an object rendered from viewpoints not included in the input images.

We applied our framework to model the appearance of a real object. We took 8 color images, each from different position roughly on a circle around the object. The images were taken with a digital camera, while trying to keep the angle between each camera positions similar, so that the object was observed uniformly. FIGS. 9A and 9B show two of the input images. We used a laser stripe range scanner to obtain a geometric model of the object, and simplified it to a mesh model with 2834 triangular facets. FIG. 10 shows the texture variation for two different triangular patches, through the input image sequence, and the corresponding global texture derived from them on the right side. Note, both were visible only in three images. The upper row is the successful case, showing by taking the minimal pixel values we can get the diffuse reflection component separated out. The middle in upper row has the highlight. The lower row shows an example when noise is introduced into the global texture. The third texture in the lower row has some amount of the texture which should have corresponded to a neighboring triangular patch, and this results in the noise in the global texture on the right hand side. The image in FIG. 11A is a global-texture mapped object image, rendered from the viewpoint corresponding to the image of FIG. 9A. Errors can be seen on the frame of the sunglasses, due to the alignment of images and the 3D model. The image of FIG. 11B shows the specular image corresponding to the image of FIG. 9A. The noise introduced in the former step from generating the global texture map, will appear in the specular images, and will be directly mapped onto the partial illumination hemispheres, as seen in the images of FIGS. 12A and 12B. However, most of these noise values are eliminated when combining the partial illumination hemispheres as described previously. The result is the images seen in FIG. 12C. By sampling this initial generalized illumination hemisphere uniformly, and through the two step numerical minimization described previously (see FIG. 13 for M-estimator error for each iteration), we obtain a refined illumination hemisphere as shown in FIG. 12D and the surface reflectance parameters, $k_s$=626.0 and $\sigma$=0.0114 for this object. Each specular image was thresholded with a certain brightness value and then sampled by picking up every other pixel. We used a geodesic hemisphere with 18000 nodes to sample the illumination hemisphere. In the initial illumination hemisphere, 1757 nodes had values assigned, and after the parameter estimation it decreased to 1162. FIGS. 14A and 14B show a side by side comparison of one of the input images (FIG. 14A) and a corresponding synthetic image (FIG. 14B) rendered using the refined illumination hemisphere and estimated reflectance parameters. Although the highlights are rendered close to the original in shape and brightness, their positions are slightly different from those in the original images. This is because we use a hemisphere for approximation, which means we assume all the light sources are at the same distance from the object center. Thus, the estimated distribution of lights is slightly different from that in real environment. Also since we use a simplified mesh model, the shape details are not totally preserved, resulting in different shape highlight on the upper left side of the penguin. FIGS. 15A and 15B show two synthetic images rendered from a new viewpoint. Triangular patches under the bill of the penguin were not visible in the input images, so they are rendered in black.

7.0 REFERENCES

Y. Sato, M. D. Wheeler, and K. Ikeuchi. Object shape and reflectance modeling from observation. In *Computer Graphics Proceedings, ACM SGGRAPH* 97, pages 379387, August 1997.

Y. Yu, P. Debevec, J. Malik, and T. Hawkins. Inverse Global Illumination: Recovering Reflectance Models of Real Scenes From Photographs. In *Computer Graphics Proceedings, ACM SIGGRAPH99*, pages 215224, August 1999.

D. N. Wood, D. I. Azuma, K. Aldinger, B. Curless, T. Duchamp, D. H. Salesin, and W. Stuetzle. Surface Light Fields for 3D Photography. In *Computer Graphics Proceedings, ACM SIGGRAPH* 00, pages 287296, July 2000.

R. Y. Tsai. A versatile camera calibration technique for high-accuracy 3D machine vision metrology using off-the-shelf cameras and lenses. *IEEE Journal of Robotics and Automation*, 3(4):323344, August 1987.

Z. Zhang. Flexible Camera Calibration By Viewing a Plane From Unknown Orientations. In *Proc. of Seventh International Conference on Computer Vision ICCV* "99, pages 666673, September 1999.

What is claimed is:

1. A computer-implemented process for efficiently representing an object to allow the synthesizing of photo-realistic images of the object that depicts both diffuse and specular reflections, said process comprising using a computer to perform the following process actions:

inputting images of the object;

inputting a 3D model of the object;

computing a global texture map which specifies an intensity value for the diffuse reflection from each portion of the surface of the object as modeled in the 3D model using the input images;

computing a separate specular reflection image from each input image and the global texture map which specifies an intensity value for the specular reflection from each modeled portion of the surface of the object depicted in the input image under consideration;

modeling the illumination distribution of the environment surrounding the object from the specular reflection images; and estimating the surface spectral magnitude and surface roughness of the object.

2. The process of claim 1, wherein the process action of inputting images of the object comprises the actions of:

computing the intrinsic parameters associated with a camera used to capture the images; and computing the extrinsic camera parameters associated with each of the input images.

3. The process of claim 1, wherein the input images are a sparse set of images limited to a number that collectively depicts every surface of the object that it is desired to render in the synthesized images from a viewpoint that captures substantially only diffuse reflection.

4. The process of claim 1, wherein the process action of computing a global texture map, comprises the actions of:

respectively identifying sets of pixels in the input images that depict the same portion of the object; and for each identified set of pixels, determining which pixel of the set has the minimum pixel intensity value, and assigning that pixel value to the location of the global texture map corresponding to the portion of the object depicted in the set of pixels, wherein the minimum pixel intensity value represents the diffuse reflection intensity value associated with the depicted portion of the object.

5. The process of claim 1, wherein the process action of computing the specular reflection images, comprises the actions of, for each input image:

determining the diffuse reflection intensity value associated with each pixel of the input image from the global texture map;

subtracting the diffuse reflection intensity value of each pixel from the total intensity value of that pixel;

designating the result of the subtraction for each pixel as the specular reflection intensity value for that pixel.

6. The process of claim 1, wherein the process action of modeling the illumination distribution of the environment surrounding the object, comprises the actions of:

establishing a hemisphere of a prescribed radius which is deemed to overlie the object and which is centered about the object;

producing a separate illumination hemisphere associated with each respective specular image by, for each pixel of each specular image in turn, determining the point of intersection with the hemisphere of a line originating from the location on the object's surface corresponding to the pixel, said line being directed along the perfect mirror direction with respect to the optical ray of the pixel, wherein the optical ray of a pixel is defined as a line originating from the optical center of the camera used to capture the input image associated with the specular image under consideration which goes through the input image pixel corresponding to the specular image pixel under consideration, and associating the intensity value of the specular image pixel to the intersection point; and combining the illumination hemisphere associated with each specular image to create a generalized illumination hemisphere, said generalized illumination hemisphere modeling the illumination distribution of the environment surrounding the object.

7. The process of claim 6, wherein the process action of establishing the hemisphere, comprises characterizing the hemisphere as a geodesic dome having a plurality of vertices, and wherein the process further comprises an action of, prior to combining the illumination hemispheres associated with each specular image, assigning each intensity value associated with an intersection point to the vertex point of the geodesic dome which is closest to the intersection point.

8. The process of claim 7, wherein the process action of combining the illumination hemisphere associated with each specular image, comprises the process actions of:

whenever more than one intensity value is assigned to the same vertex of the geodesic dome representing the hemisphere, computing the mean of the intensity values; and reassigning the mean intensity value to said vertex in lieu of the individual intensity values.

9. The process of claim 7, wherein the process action of combining the illumination hemisphere associated with each specular image, comprises the process actions of:

for each geodesic dome vertex point, determining in how many of the specular images that the vertex point is visible, determining how many intensity values have been assigned to the vertex point among all the individual illumination hemispheres created from the specular images, comparing the number of specular images in which the vertex point is visible to the number of intensity values assigned to the point, and whenever the compared numbers do not match, eliminating the intensity values assigned to the vertex point from each of the illumination hemispheres;

computing the mean of the intensity values assigned to each vertex point of the geodesic dome having more than one intensity value assigned thereto; and reassigning the mean intensity value to said vertex point in lieu of the individual intensity values.

10. The process of claim 1, wherein the process action of estimating the surface spectral magnitude and surface roughness of the object, comprises the actions of:

establishing a reflection model which characterizes the specular reflection from a location on the surface of the object in terms comprising the surface spectral magnitude, the surface roughness and the magnitude of the color vector associated with each point light source defined by the illumination distribution model; and computing the values for the surface spectral magnitude, the surface roughness, and the magnitude of the color vector associated with each point light source which collectively minimize the difference between the specular reflection intensity computed using the reflection model and the intensity of the specular reflection taken from the computed specular images, for each location on the surface of the object corresponding to a pixel of the specular images.

11. The process of claim 10, wherein the illumination distribution model comprises a plurality of point light sources each of which is assigned an intensity values, and wherein the process further comprises a process action of refining the illumination distribution model by replacing the intensity values associated with each point light source defined in the illumination distribution model with the computed magnitude of the color vector associated with the point light source.

12. A system for synthesizing photo-realistic images of the object that depicts both diffuse and specular reflections, comprising:

a general purpose computing device; and a computer program comprising program modules executable by the computing device, wherein the computing device is directed by the program modules of the computer program to, input images of the object, input a 3D model of the object, compute a global texture map which specifies an intensity value for the diffuse reflection from each portion of the surface of the object as modeled in the 3D model using the input images, compute a separate specular reflection image from each input image and the global texture map which specifies an intensity value for the specular reflection from each modeled portion of the surface of the object depicted in the input image under consideration, model the illumination distribution of the environment surrounding the object from the specular reflection images, estimate the surface spectral magnitude and surface roughness of the object, and synthesize images of the object from a desired viewpoint using the global texture map and modeled illumination distribution, as well as the surface spectral magnitude and surface roughness of the object.

13. The system of claim 12, wherein the input images are made by moving a camera about the object to capture the object from different perspectives, and wherein the lighting condition are not allowed to vary significantly and the object is not allowed to move during the time that the input images are captured.

14. The system of claim 12, wherein the 3D model represents the object as a mesh of triangular patches, and wherein the program module for computing a global texture map, comprises sub-modules for:

mapping each input image onto the 3D model so as to identify the location on the model associated with each pixel of each input image;

respectively identifying sets of pixels in the input images that depict the same location in each triangular patch of the 3D model of the object, and for each identified set of pixels, determining which pixel of the set has the minimum pixel intensity value, and assigning that pixel value to a location of the global texture map corresponding to the location in the 3D model associated with that set of pixels, wherein the minimum pixel intensity value represents the diffuse reflection intensity value for that location.

15. The system of claim 14, further comprising a sub-module for normalizing each triangular patch to a prescribed size.

16. The system of claim 15, wherein the prescribed size of each triangular patch is a triangle with legs 20 pixels in length.

17. The system of claim 12, wherein the program module for estimating the surface spectral magnitude and surface roughness of the object, comprises sub-modules for:

establishing a reflection model which characterizes the specular reflection $I_S$ from a location on the surface of the object as $$I_S = \frac{2\pi}{N_L} k_{S,v} \sum_{l}^{N_L} L_l \frac{1}{\cos\theta_r} \exp\left[-\frac{\alpha^2}{2\sigma_v^2}\right]$$

wherein $l$ is a variable referring to one of the point light sources defined by the illumination model, $N_L$ is the total number of point light sources, $k_{S,v}$ is the surface spectral magnitude, $\sigma_v$ is the surface roughness, $L_l$ is the magnitude of the color vector associated with each point light source, $\sigma_r$ is the angle between the surface normal of the location on the object under consideration and a viewing direction from the viewpoint from which one of the input image images was captured and said surface location, and $\alpha$ is the angle between said surface normal and a bisector of said viewing direction and the direction of the point light source under consideration from the location under consideration;

computing the values for the surface spectral magnitude, the surface roughness, and the magnitude of the color vector associated with each point light source which collectively minimize the square of the respective differences between the intensity of the specular reflection taken from each pixel of the computed specular images and the specular reflection intensity computed using the reflection model given the viewing direction associated with the specular image pixel.

18. The system of claim 17, further comprising a program module for refining the illumination distribution model by replacing the intensity values associated with each point light source defined in the illumination distribution model with the computed magnitude of the color vector associated with the point light source.

19. The system of claim 12, wherein the program module for synthesizing images of the object from a desired viewpoint, comprises sub-modules for:

using the global texture map to identify the diffuse reflection component associated with each separate portion of the 3D model of the object visible from the desired viewpoint to create a diffuse reflection image for the desired viewpoint;

using the modeled illumination distribution and estimated surface reflectance parameters to identify the specular reflection component associated with each separate portion of the 3D model of the object visible from the desired viewpoint to create a specular reflection image for the desired viewpoint; and compositing the diffuse and specular reflection images.

20. A computer-readable medium having computer-executable instructions for efficiently representing an object to allow the synthesizing of photo-realistic images of the object that depicts both diffuse and specular reflections, said computer-executable instructions comprising:

inputting a set of input images of the object, said set of images at least collectively depicting every surface of the object that it is desired to depict in the synthesized images from a viewpoint that captures substantially only diffuse reflection;

inputting a 3D model of the object;

matching each pixel in each input image to a location on the object in the model corresponding to the portion of the object depicted by that pixel;

computing a global texture map which specifies an intensity value for the diffuse reflection from each portion of the surface of the object as modeled in the 3D model using the input images;

computing a separate specular reflection image from each input image and the global texture map which specifies an intensity value for the specular reflection from each modeled portion of the surface of the object depicted in the input image under consideration;

modeling the illumination distribution of the environment surrounding the object from the specular reflection images; and estimating the reflectance parameters associated with the objects surface, comprising the overall surface spectral magnitude and overall surface roughness of the object.

* * * * *

UNITED STATES PATENT AND TRADEMARK OFFICE
CERTIFICATE OF CORRECTION

PATENT NO. : 6,639,594 B2
DATED : October 28, 2003
INVENTOR(S) : Zhengyou Zhang et al.

It is certified that error appears in the above-identified patent and that said Letters Patent is hereby corrected as shown below:

Column 15,
Line 47, "K" should be changed to -- $K_s$ --

Column 16,
Line 58, "Y" should be changed to -- σ --

Column 17,
Line 43, equation should appear as follows:

$$I_s = \frac{2\pi}{N_L} k_{S,v} \sum_{I}^{N_L} L_I \frac{1}{\cos\theta_r} \exp\left[\frac{\alpha^2}{-2\sigma_v^2}\right]$$

Line 59, "a" should be changed to -- σ --

Column 18,
Line 7, equation should appear as follows:

$$E(x) = \frac{1}{N_v} \sum_{v}^{N_v} p(z_v(x))$$

Signed and Sealed this

Second Day of March, 2004

JON W. DUDAS
*Acting Director of the United States Patent and Trademark Office*